(12) United States Patent
Jung

(10) Patent No.: US 12,523,013 B2
(45) Date of Patent: Jan. 13, 2026

(54) HYDRAULIC SYSTEM FOR RECOVERING BOOM ENERGY FOR CONSTRUCTION MACHINERY

(71) Applicant: READI ROBUST MACHINE CO., LTD., Busan (KR)

(72) Inventor: Tae Rang Jung, Gyeongsangnam-do (KR)

(73) Assignee: READI ROBUST MACHINE CO., LTD., Busan (KR)

( * ) Notice: Subject to any disclaimer, the term of this patent is extended or adjusted under 35 U.S.C. 154(b) by 0 days.

(21) Appl. No.: 18/869,663

(22) PCT Filed: May 25, 2023

(86) PCT No.: PCT/KR2023/007217
§ 371 (c)(1),
(2) Date: Nov. 26, 2024

(87) PCT Pub. No.: WO2023/229409
PCT Pub. Date: Nov. 30, 2023

(65) Prior Publication Data
US 2025/0297461 A1    Sep. 25, 2025

(30) Foreign Application Priority Data

May 27, 2022 (KR) .................. 10-2022-0065458
May 24, 2023 (KR) .................. 10-2023-0067001

(51) Int. Cl.
*E02F 9/22* (2006.01)
*E02F 3/43* (2006.01)
*F15B 1/027* (2006.01)

(52) U.S. Cl.
CPC .............. *E02F 9/2278* (2013.01); *E02F 3/43* (2013.01); *E02F 9/2267* (2013.01); *F15B 1/027* (2013.01)

(58) Field of Classification Search
CPC .......... F15B 1/027; F15B 21/14; E02F 9/2217
See application file for complete search history.

(56) References Cited

U.S. PATENT DOCUMENTS

2010/0089045 A1* 4/2010 Shimada ............... E02F 9/2285
60/431
2021/0131452 A1* 5/2021 Takahashi ............... E02F 9/267

FOREIGN PATENT DOCUMENTS

JP    2010-230039 A    10/2010
JP    2017-057865 A     3/2017
(Continued)

OTHER PUBLICATIONS

Office Action from corresponding Korean Patent Application No. 10-2023-0067001, dated Mar. 10, 2025.
(Continued)

*Primary Examiner* — Abiy Teka
(74) *Attorney, Agent, or Firm* — Harness, Dickey & Pierce, P.L.C.

(57) ABSTRACT

The present disclosure relates to a hydraulic system for recovering boom energy for construction machinery, and more particularly, to a hydraulic system for recovering boom energy for construction machinery, which is capable of recovering boom energy generated during boom-down of a boom in construction machinery to apply the same immediately to boom-up, thereby improving a boom-up speed by a boom cylinder, and of using the boom energy for a variety of different operations of the construction machinery. According to the present disclosure, the hydraulic system is able to recover and utilize energy wasted in the event of boom-down and to be easily installed in or detached from existing construction machinery.

9 Claims, 11 Drawing Sheets

(56) References Cited

FOREIGN PATENT DOCUMENTS

| | | |
|---|---|---|
| JP | 2019-031989 A | 2/2019 |
| JP | 6752963 B2 | 9/2020 |
| KR | 10-2004-0083168 A | 10/2004 |
| KR | 10-2309862 B1 | 10/2021 |

OTHER PUBLICATIONS

International Search Report from corresponding PCT Application No. PCT/KR2023/007217, dated Sep. 19, 2023.

* cited by examiner

HYDRAULIC SYSTEM FOR RECOVERING BOOM ENERGY FOR CONSTRUCTION MACHINERY

CROSS-REFERENCE TO RELATED APPLICATIONS

This application is a national phase application of PCT Application No. PCT/KR2023/007217 filed on May 25, 2023, which claims benefit of Korean Patent Application Nos. 10-2022-0065458 filed on May 27, 2022 and 10-2023-0067001 filed on May 24, 2023. The entire disclosure of the applications identified in this paragraph are incorporated herein by references.

TECHNICAL FIELD

The present disclosure relates to a hydraulic system for recovering boom energy for construction machinery, and more particularly, to a hydraulic system for recovering boom energy for construction machinery, which is capable of recovering boom energy generated during boom-down of a boom in construction machinery to apply the same immediately to boom-up, thereby improving a boom-up speed by a boom cylinder, and of using the boom energy for a variety of different operations of the construction machinery.

BACKGROUND ART

Forklifts or excavators are construction machines that are typically used for digging into or cutting the ground, and are widely used in construction sites and various industrial sites. These forklifts may each include a boom having an end movable along a curved trajectory, and the end of the boom may be equipped with different tools including buckets.

The boom is connected with a hydraulic cylinder, and the hydraulic cylinder drives the boom while moving up and down. The hydraulic cylinder is moved up and down by means of the flow of oil in hydraulic systems. The forklift includes a power means such as an engine. The engine may provide force for the flow of oil in hydraulic systems and at the same time provide power for the movement of the forklift.

Typically, the forklift consumes a lot of fuel when moving because it is very heavy. In addition, a lot of fuel is consumed to drive the boom because the dead weight of the boom is large.

With the recent emergence of green issues, various technologies are developed and researched to improve fuel efficiency in the field of construction machinery such as forklifts. For example, a technology or the like has been proposed to assist in the movement of a forklift or the actuation of a boom by recovering the boom energy (e.g., potential energy) of the boom and then temporarily storing it when the boom of the forklift is moved down.

However, these conventional technologies may reduce work efficiency due to great restrictions on the working operation or working speed of the boom or the like, and may be very difficult to install on a variety of existing forklifts.

Meanwhile, when recovering boom energy in construction machinery including forklifts or excavators, the recovered boom energy may be used to assist the driving energy of an internal combustion engine using a mechanical energy conversion unit. In addition, the recovered boom energy is converted into electrical energy for use.

However, when energy is converted to use recovered boom energy, a lot of energy loss may occur due to too many energy conversion steps and the complicated configuration of the conversion unit. Moreover, the significant cost of manufacturing and installing the conversion unit to convert boom energy may increase overall manufacturing costs.

PRIOR ART LITERATURE

Patent Document (Patent Document 1) Korean Patent No. 10-2309862

DISCLOSURE

Technical Problem

The present disclosure has been made in view of the technical background as described above, and is directed to use for construction machinery. An object of the present disclosure is to provide a hydraulic system for recovering boom energy for construction machinery, which is capable of recovering boom energy generated during boom-down of a boom in construction machinery and then using the recovered boom energy immediately in a boom cylinder, thereby improving a boom-up speed by the boom cylinder to rapidly perform boom-up motion and improving work efficiency, of using the boom energy for a variety of different operations of the construction machinery to promote fuel savings and improvement in performance, and of being easily installed in or detached from existing construction machinery.

Technical Solution

In accordance with an aspect of the present disclosure, there is provided a hydraulic system for recovering boom energy for construction machinery, which is installed in a construction machine to recover and reuse energy during boom-down by controlling a flow of oil, wherein the construction machine includes a boom cylinder including a rod raised and lowered by means of the flow of oil, a large chamber, and a small chamber formed on the large chamber, an accumulator assembly including an accumulator connected to the boom cylinder to accumulate oil, and a boom driven up/down by the boom cylinder by means of the flow of oil. The hydraulic system includes a main control valve configured to allow the boom to be moved up/down by the boom cylinder, a valve assembly including a plurality of lines through which oil flows, and at least one valve installed in a selected one of the plurality of lines to control a flow rate of oil, an engine connected at its shaft to a main pump to provide the flow of oil to the boom cylinder and provide a driving force for construction machine running, buckets, and arms, and a driving force for body swing, and a controller configured to control the flow of oil based on an operation signal, wherein the oil discharged from the large chamber during boom-down by the boom cylinder is recovered and immediately reused.

The main control valve may include a spool operated to allow oil to flow toward the large chamber or the small chamber in the boom cylinder, a boom-up valve line connected to the spool and in which oil flows into the large chamber by movement of the spool to allow the boom to be moved up, a boom-down valve line connected to the spool and in which oil flows into the small chamber by movement of the spool to allow the boom to be moved down, a boom-up valve placed in the boom-up valve line to control the spool so that oil flows into the large chamber, and a boom-down valve placed in the boom-down valve line to control the spool so that oil flows into the small chamber.

The controller may be connected to a joystick that controls boom-up or boom-down motion of the boom.

In addition, the controller may be configured to receive measured values by connection to a first sensor connected to the joystick to detect a change in pressure for the boom-up motion by the joystick and generate an operation signal, and a second sensor connected to the joystick to detect a change in pressure for the boom-down motion by the joystick and generate an operation signal, and to control whether to open or close the boom-up valve or the boom-down valve based on the operation signals generated by the first sensor and the second sensor.

Furthermore, the controller may be configured to receive measured values by connection to third and fourth sensors for measuring a hydraulic pressure in the boom cylinder and a fifth sensor for measuring a pressure in the accumulator, and to control the flow rate of oil by opening and closing one or more valves installed in a selected one of the plurality of lines of the valve assembly, based on the measured values received from the third sensor, the fourth sensor, and the fifth sensor.

The valve assembly may include a first line having one side connected to the large chamber in the boom cylinder, a second line connecting the first line and the accumulator, a third line connecting the first line and the accumulator, a fifth line having one side connected to the small chamber in the boom cylinder, a sixth line branched from the first line and connected to the fifth line, a seventh line branched from the first line, and an eighth line having one side connected to the fifth line and the sixth line. The valve assembly may include an AC valve placed in the second line to allow oil to flow only toward the accumulator and configured to control the flow rate of oil, a CA valve placed in the third line to allow oil to flow only toward the first line and configured to control the flow rate of oil, an AB valve placed in the sixth line to control the flow rate of oil, and a release valve placed on a passage between the accumulator and an oil tank and operated in an on/off manner.

When the boom is moved down, the AC valve placed in the second line may be opened so that the oil discharged from the large chamber flows into the accumulator through the first line and the second line for accumulation, and the CA valve placed in the third line may be opened to introduce the oil accumulated in the accumulator into the large chamber in the boom cylinder through the third line and the first line and to use energy recovered in the event of boom-down immediately for boom-up.

The valve assembly may include a first line having one side connected to the large chamber in the boom cylinder, a second line connecting the first line and the accumulator, a third line having one side connected to the accumulator, a fifth line having one side connected to the small chamber in the boom cylinder, a sixth line branched from the first line and connected to the fifth line, a seventh line branched from the first line, an eighth line having one side connected to the fifth line and the sixth line, and a ninth line connecting the third line and the main pump. The valve assembly may include an AC valve placed in the second line to allow oil to flow only toward the accumulator and configured to control the flow rate of oil, a CA valve placed in the third line to allow oil to flow only toward the ninth line and configured to control the flow rate of oil, an AB valve placed in the sixth line to control the flow rate of oil, and a release valve placed on a passage between the accumulator and an oil tank and operated in an on/off manner.

When the boom is moved down, the AC valve placed in the second line may be opened so that the oil discharged from the large chamber flows into the accumulator through the first line and the second line for accumulation, and the CA valve placed in the third line may be opened to introduce the oil accumulated in the accumulator into the main pump through the third line and the ninth line and to use energy recovered in the event of boom-down for driving the engine through the main pump and immediately for the driving force for construction machine running, boom cylinders, buckets, and arms, and the driving force for body swing.

The valve assembly may include a first line having one side connected to the large chamber in the boom cylinder, a second line connecting the first line and the accumulator, a third line connecting the first line and the accumulator, a fifth line having one side connected to the small chamber in the boom cylinder, a sixth line branched from the first line and connected to the fifth line, a seventh line branched from the first line, an eighth line having one side connected to the fifth line and the sixth line, and a ninth line connecting the third line and the main pump. The valve assembly may include an AC valve placed in the second line to allow oil to flow only toward the accumulator and configured to control the flow rate of oil, a first CA valve placed in the first line adjacent to a connection point between the first line and the third line to allow oil to flow only toward the first line and control the flow rate of oil, a second CA valve placed in the ninth line to allow oil to flow only to the main pump through the ninth line and control the flow rate of oil, an AB valve placed in the sixth line to control the flow rate of oil, and a release valve placed on a passage between the accumulator and an oil tank and operated in an on/off manner.

When the boom is moved down, the AC valve placed in the second line may be opened so that the oil discharged from the large chamber flows into the accumulator through the first line and the second line for accumulation, and the second CA valve placed in the ninth line may be closed and the first CA valve placed in the first line adjacent to the connection point between the first line and the third line may be opened, to introduce the oil accumulated in the accumulator into the large chamber in the boom cylinder through the third line and the first line and to use energy recovered in the event of boom-down immediately for boom-up.

In addition, when the boom is moved down, the AC valve placed in the second line may be opened so that the oil discharged from the large chamber flows into the accumulator through the first line and the second line for accumulation, and the first CA valve placed in the first line adjacent to the connection point between the first line and the third line may be closed and the second CA valve placed in the ninth line may be opened, to introduce the oil accumulated in the accumulator into the main pump through the third line and the ninth line and to use energy recovered in the event of boom-down for driving the engine through the main pump and immediately for the driving force for construction machine running, boom cylinders, buckets, and arms, and the driving force for body swing.

Advantageous Effects

According to the present disclosure, a hydraulic system for recovering boom energy for construction machinery has an effect in that it is able to recover boom energy generated during boom-down of a boom in construction machinery and then use the recovered boom energy immediately in a boom cylinder, thereby improving a boom-up speed by the boom cylinder to rapidly perform boom-up motion and improving work efficiency, to use the boom energy for a variety of different operations of the construction machinery to promote fuel savings and improvement in performance, to have an overall compact configuration through elimination of mechanical and electrical energy conversion units for converting boom energy, and to be easily installed in or detached from existing construction machinery.

LIST OF REFERENCE NUMERALS

Figure 1:
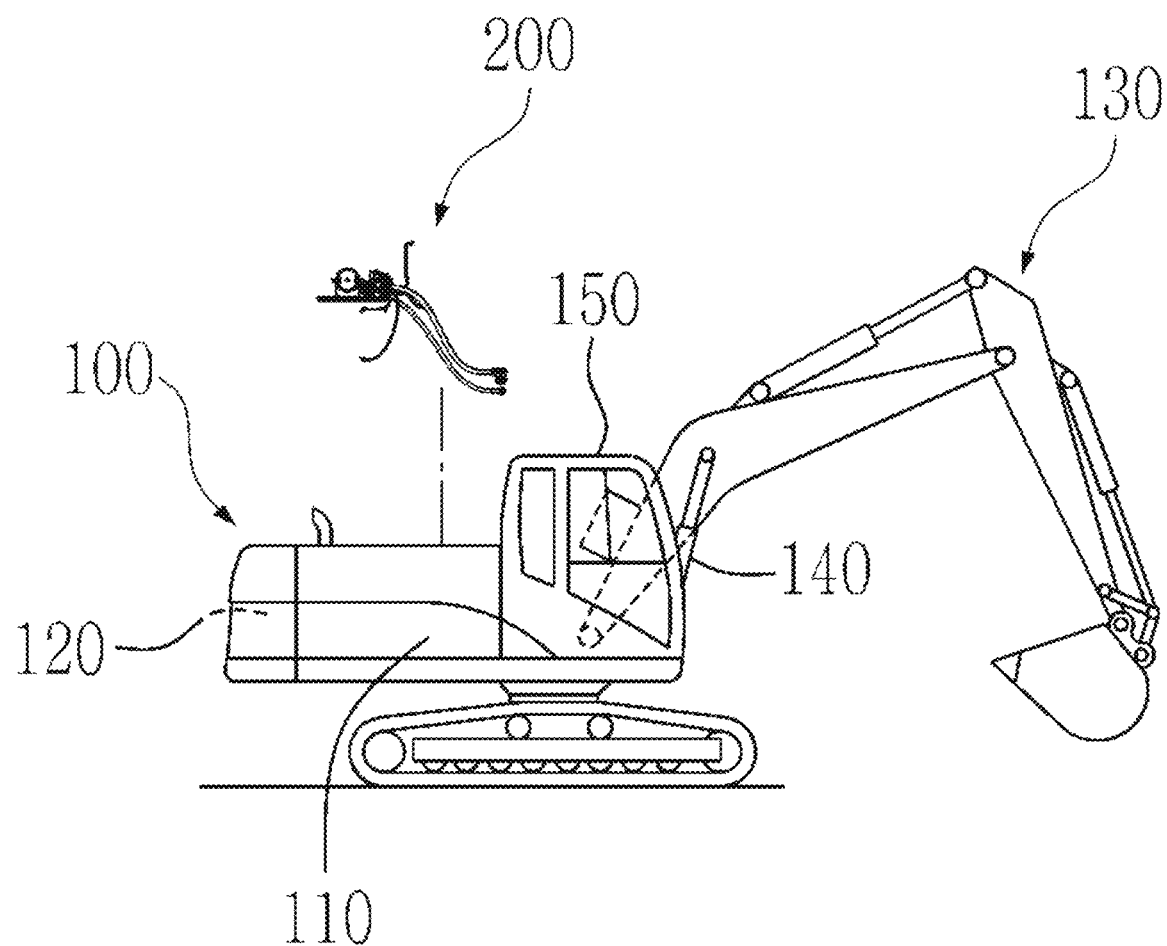
FIG. 1 is a conceptual view illustrating an overall appearance of a construction machine according to an embodiment of the present disclosure.

100: construction machine
110: body
120: engine
121: shaft
122: main pump
123: auxiliary pump
130: boom
140: boom cylinder
141: rod
142: large chamber
143: small chamber
144: large chamber line
145: small chamber line
150: cabinet
151: joystick
160: main control valve
161: spool
162: main valve line
163: boom-up valve
164: boom-down valve
165: boom-up valve line
166: boom-down valve line
170: controller
200: accumulator assembly
210: bracket
211: mount
212: hollow
213: groove
220: accumulator
230: valve assembly
240: main pipe
241: joint block
250: pilot pipe
400: mobile device
CA: CA valve
CA1: first CA valve
CA2: second CA valve
AC: AC valve
AB: AB valve
RE: release valve
L1: first line
L2: second line
L3: third line
L5: fifth line
L6: sixth line
L7: seventh line
L8: eighth line
L9: ninth line
S1: first sensor
S2: second sensor
S3: third sensor
S4: fourth sensor
S5: fifth sensor
T: oil tank
T1: first oil tank
T2: second oil tank
T3: third oil tank Best Mode The present disclosure provides a hydraulic system for recovering boom energy for construction machinery, which is installed in a construction machine to recover and reuse energy during boom-down by controlling a flow of oil, wherein the construction machine includes a boom cylinder including a rod raised and lowered by means of the flow of oil, a large chamber, and a small chamber formed on the large chamber, an accumulator assembly including an accumulator connected to the boom cylinder to accumulate oil, and a boom driven up/down by the boom cylinder by means of the flow of oil. The hydraulic system includes a main control valve configured to allow the boom to be moved up/down by the boom cylinder, a valve assembly including a plurality of lines through which oil flows, and at least one valve installed in a selected one of the plurality of lines to control a flow rate of oil, an engine connected at its shaft to a main pump to provide the flow of oil to the boom cylinder and provide a driving force for construction machine running, buckets, and arms, and a driving force for body swing, and a controller configured to control the flow of oil based on an operation signal, wherein the oil discharged from the large chamber during boom-down by the boom cylinder is recovered and immediately reused.

Mode for Disclosure

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/ or combinations thereof. Reference will now be made in detail to exemplary embodiments of the present disclosure, examples of which are illustrated in the accompanying drawings. It should be noted that like reference numerals refer to like parts throughout various drawings and exemplary embodiments.

In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

First Embodiment

Hereinafter, a hydraulic system for recovering boom energy for construction machinery and a construction machine including the same according to the present disclosure will be described in detail with reference to the accompanying drawings.

Figure 2:
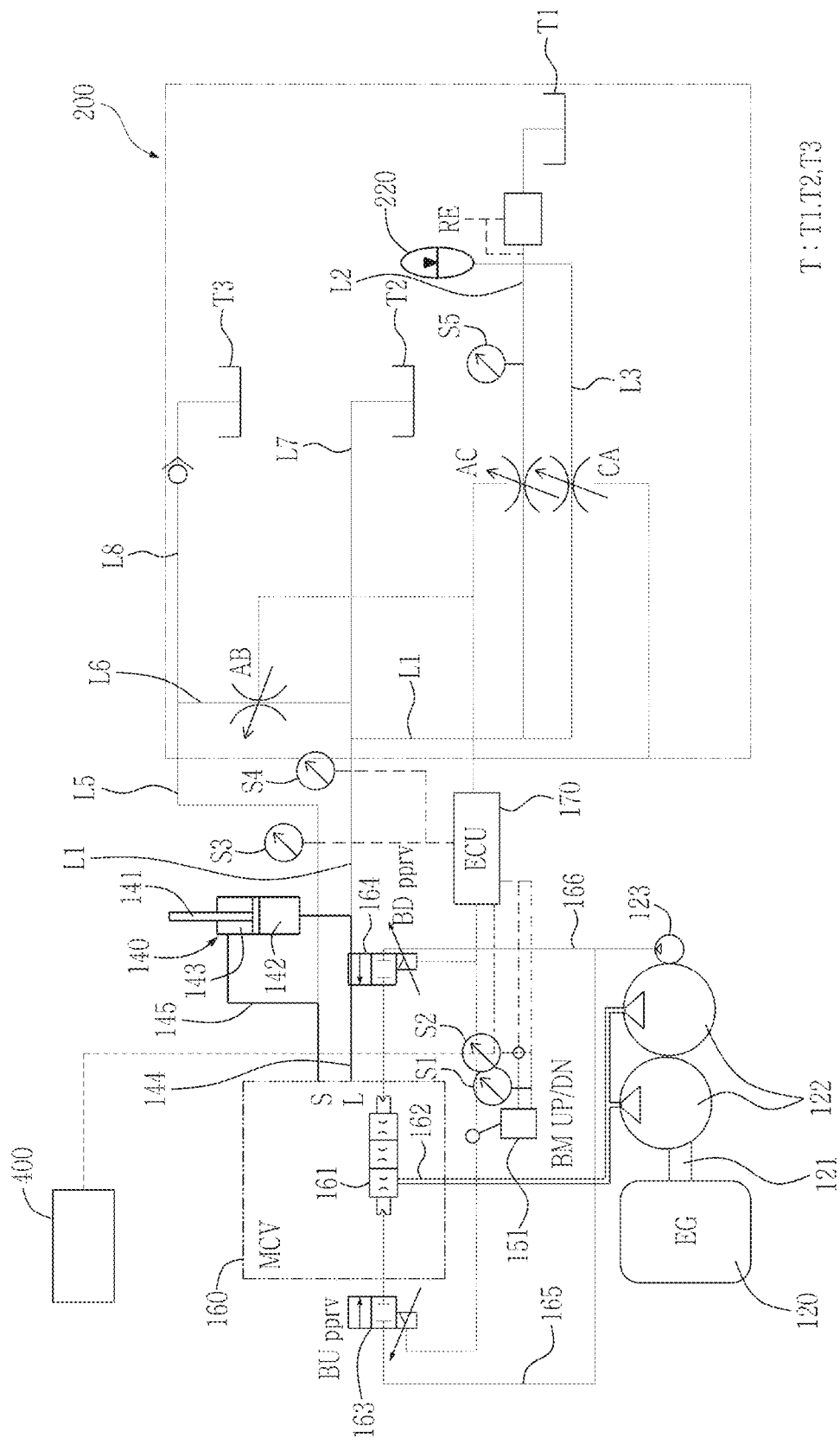
FIG. 2 is a schematic diagram illustrating a hydraulic system for recovering boom energy for construction machinery according to a first embodiment of the present disclosure.
Figure 3:
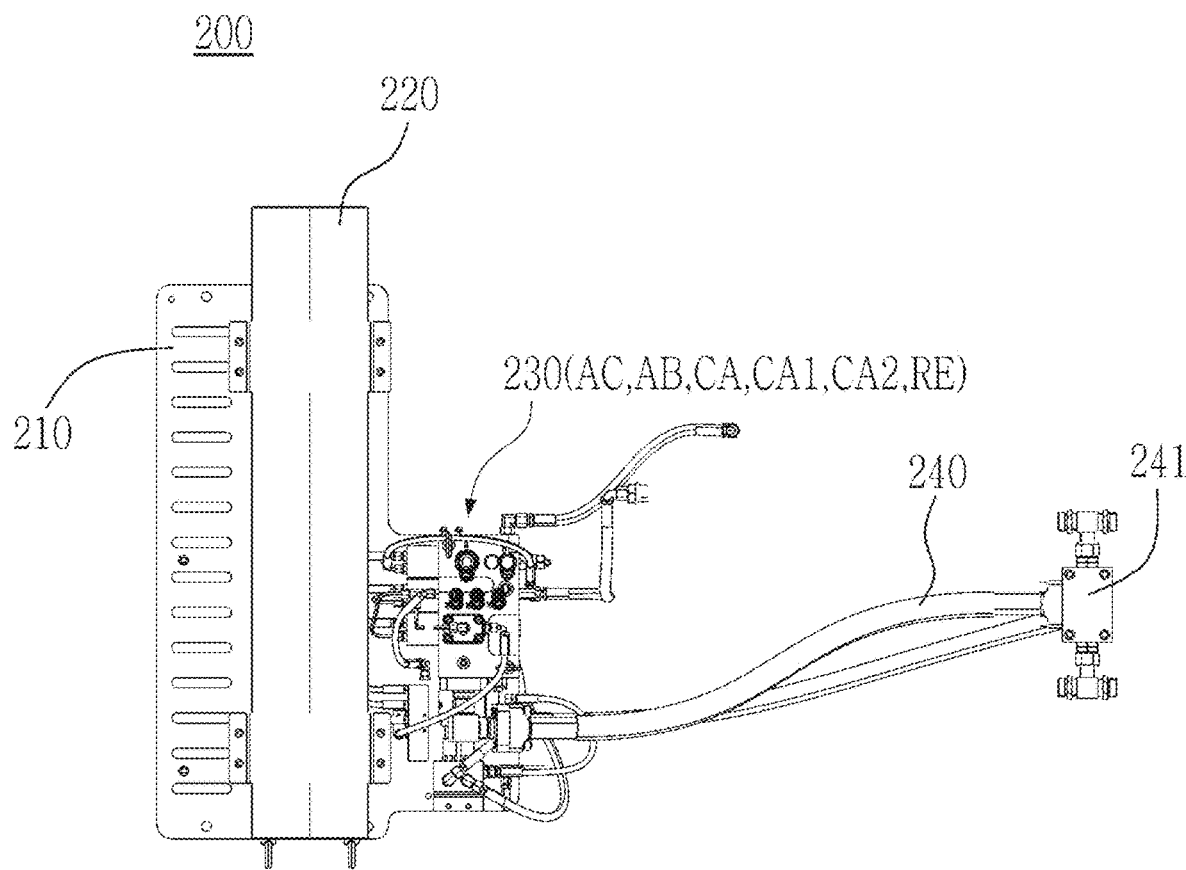
FIG. 3 is a top view illustrating an accumulator assembly according to the first embodiment of the present disclosure.
Figure 4:
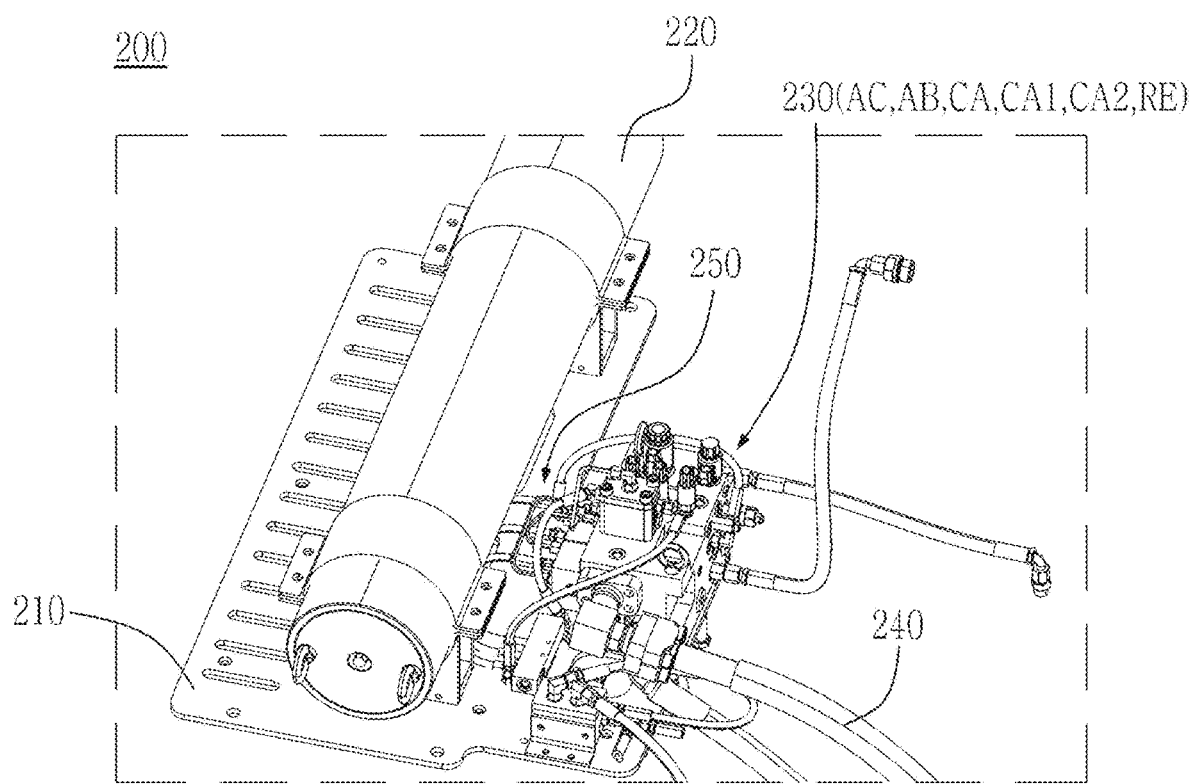
FIG. 4 is a perspective view illustrating the accumulator assembly according to the first embodiment of the present disclosure.
Figure 5:
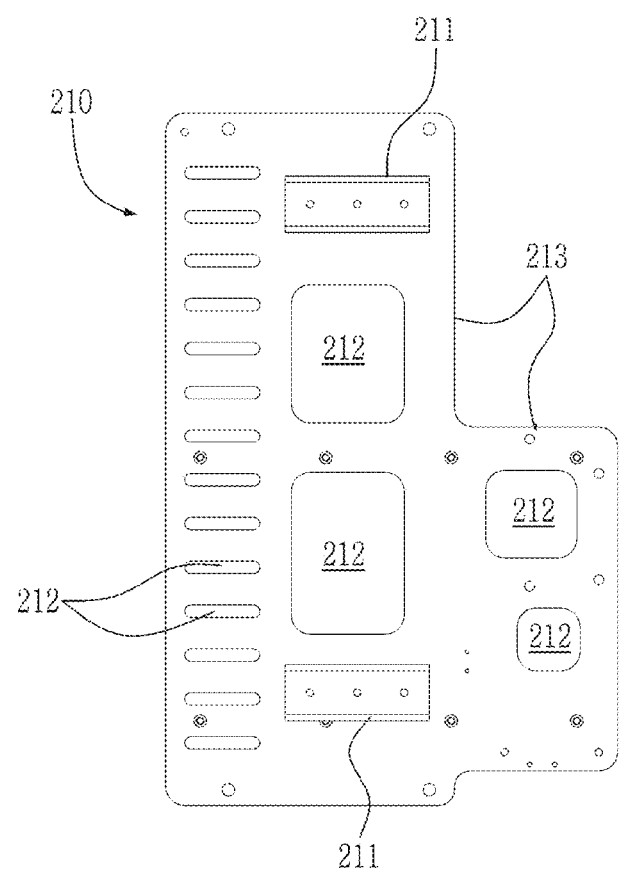
FIG. 5 is a top view illustrating a bracket cut out from the accumulator assembly according to the first embodiment of the present disclosure.
Figure 6:
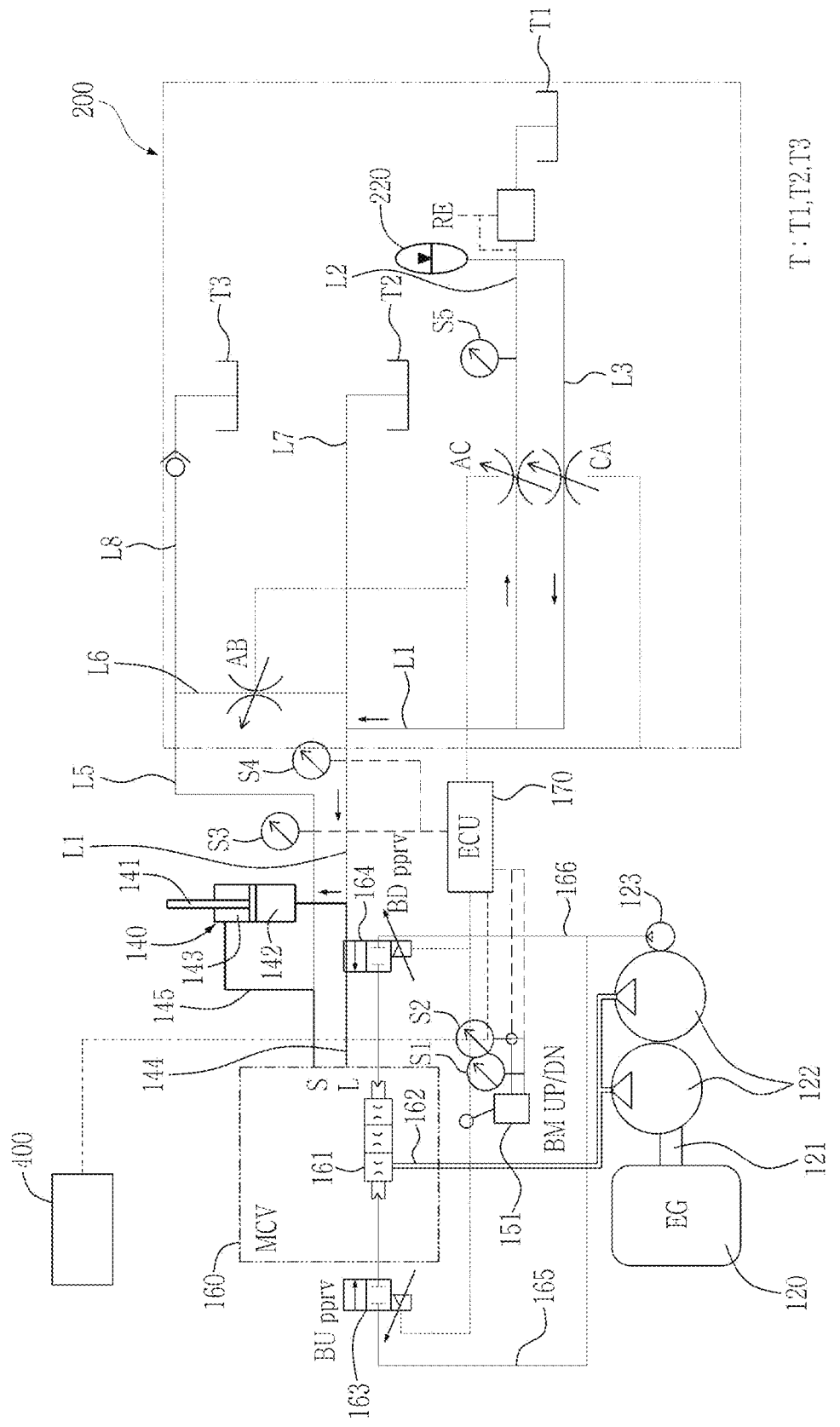
FIG. 6 is a schematic diagram illustrating a flow of oil when oil recovered from a large chamber during boom-down of a boom is accumulated and then supplied to the large chamber for boom-up in the hydraulic system for recovering boom energy for construction machinery according to the first embodiment of the present disclosure.

FIG. 1 is a conceptual view illustrating an overall appearance of a construction machine according to an embodiment of the present disclosure. FIG. 2 is a schematic diagram illustrating a hydraulic system for recovering boom energy for construction machinery according to a first embodiment of the present disclosure. FIG. 3 is a top view illustrating an accumulator assembly according to the first embodiment of the present disclosure. FIG. 4 is a perspective view illustrating the accumulator assembly according to the first embodiment of the present disclosure. FIG. 5 is a top view illustrating a bracket cut out from the accumulator assembly according to the first embodiment of the present disclosure. FIG. 6 is a schematic diagram illustrating a flow of oil when oil recovered from a large chamber during boom-down of a boom is accumulated and then supplied to the large chamber for boom-up in the hydraulic system for recovering boom energy for construction machinery according to the first embodiment of the present disclosure.

The hydraulic system for recovering boom energy for construction machinery according to the first embodiment of the present disclosure will be described in detail. The hydraulic system for recovering boom energy for construction machinery according to the first embodiment of the present disclosure has a structure that may be installed in and detached from a construction machine, and may be installed in the construction machine to recover and reuse boom energy.

Hereinafter, the construction machine and the hydraulic system for recovering boom energy for construction machinery installed in the construction machine according to the present disclosure will be described in detail.

Referring to the drawings, the hydraulic system for recovering boom energy for construction machinery according to the first embodiment of the present disclosure may include a main control valve 160, a valve assembly 230, an engine 120, and a controller 170, and may be installed in connection with a body 110, a boom 130, and a boom cylinder 140 of a construction machine 100.

Specifically, the boom 130 and the boom cylinder 140 may be connected to the body 110. The boom cylinder 140 may be moved up and down by means of the flow of oil, and the boom 130 may be rotated by the upward and downward movement of the boom cylinder 140.

The engine 120 may be placed inside the body 110. The engine 120 may provide the boom cylinder 140 with the flow of oil. The engine 120 may provide a driving force to a drive unit (not shown) placed at the bottom of the body 110 to run the construction machine 100. The engine 120 may provide a driving force for a bucket (not shown) and an arm (not shown) and a driving force for swing of the body 110 that is swingably installed on the drive unit.

The operation of the boom cylinder 140 will be discussed in more detail as follows. The construction machine 100 may have a cabinet 150 placed in the body 110 for an operator to board. The cabinet 150 may be provided with a joystick 151 for controlling the boom-up or boom-down motion of the boom 130.

Specifically, the boom cylinder 140 may include a rod 141 that is raised and lowered by means of the flow of oil and connected to the boom 130. The boom cylinder 140 may include a large chamber 142 and a small chamber 143 formed on the large chamber 142. The large chamber 142 and the small chamber 143 may be formed in a size of 2:1.

The rod 141 may be placed between the small chamber 143 and the large chamber 142 in the boom cylinder 140. The rod 141 may be raised when oil enters the large chamber 142, and may be lowered when oil enters the small chamber 143. The boom 130 may be moved up when the rod 141 is raised, and the boom 130 may be moved down when the rod 141 is lowered.

The accumulator assembly 200 may be connected to the boom cylinder 140 to discharge accumulated oil to the boom cylinder 140, and the oil in the boom cylinder 140 may be introduced and accumulated. Specifically, the accumulator assembly 200 includes a bracket 210, an accumulator 220, a valve assembly 230, and a main pipe 240.

The bracket 210 is detachably fastened to the body 110 of the construction machine 100, and the accumulator 220, the valve assembly 230, and the main pipe 240 are arranged on the bracket 210. The bracket 210 is a component installed on the construction machine 100, and on which the accumulator 220, the valve assembly 230, and the main pipe 240 are arranged.

The bracket 210 may have a thin plate shape or a plate shape. The bracket 210 may be placed on the outside of the construction machine 100. The bracket 210 may have a fastener (not shown) for fastening to the construction machine 100. The fastener (not shown) may be formed of, for example, a screw hole for insertion of a bolt thereinto or the like.

The main pipe 240 and the valve assembly 230 may be arranged on the front side of the bracket 210 facing the boom 130, the bracket 210 may have a hollow 212 formed on the rear side thereof, and the accumulator 220 may be placed between the front side and the rear side of the bracket 210. The bracket 210 may have a groove 213 formed on the front side thereof.

The groove 213 may be recessed rearwards from the front end of the bracket 210. The groove 213 may have a shape corresponding to the outer surface of the cabinet 150 of the construction machine 100, thereby minimizing spatial interference between the cabinet 150 and the bracket 210. The main pipe 240 and the valve assembly 230 may be arranged in an area of the front side of the bracket 210 where the groove 213 is not formed. In other words, the groove 213 may be formed on one area of the front side of the bracket 210, and the main pipe 240 and the valve assembly 230 may be arranged on the other area thereof.

The structure of this bracket 210 may allow the area of the bracket 210 where the main pipe 240 and the valve assembly 230 are arranged to be closer to the boom 130, thereby minimizing the length of various pipes or lines connected to the boom cylinder 140, resulting in minimal resistance against the flow of oil.

The hollow 212 may formed on the rear side of the bracket 210. The engine 120 may be placed on the rear side of the accumulator assembly 200. The hollow 212 may reduce the influence of heat generated by the engine 120 on the accumulator 220. The hollow 212 may also reduce the weight of the bracket 210. The hollow 212 may be formed on the rear side of the bracket 210, as well as at the center or on the front side of the bracket 210.

The accumulator 220 may be spaced apart from the rear end (end at the rear side) of the bracket 210. This makes it convenient to open an engine room to service the engine 120 and also easy for the operator to detach and install the accumulator 220, even when the accumulator assembly 200 is installed on the construction machine 100. Besides, it is possible to prevent direct transfer of the heat and vibration generated by the engine 120 to the accumulator 220.

The bracket 210 may have a mount 211 placed between the front side and the rear side thereof. The mount 211 is configured to mount the accumulator 220. The mount 211 may allow the accumulator 220 to be spaced apart from the upper surface of the bracket 210 by a predetermined distance. Accordingly, it is possible to facilitate the detachment and installation of the accumulator 220 and to prevent direct transfer of the heat and vibration generated by the engine 120 to the accumulator 220.

The bracket 210 may be detachably installed on the construction machine 100. The bracket 210 may be installed in a manner that renovates the exterior or interior of existing construction machinery. The specific size or detailed shape of the bracket 210 may be partially modified depending on the construction machine 100 to be installed. Owing to the configuration of this bracket 210, the hydraulic system according to the present disclosure may be easily and conveniently installed in a variety of existing construction machines.

The accumulator 220 may be configured to accumulate oil, and the oil accumulated in advance in the accumulator 220 may be discharged from the accumulator 220 if necessary. The main pipe 240 is connected to the boom cylinder 140. The valve assembly 230 is connected to the main pipe 240.

The main control valve 160 may be connected to the boom cylinder 140 to selectively control the flow of oil provided to the boom cylinder 140. The main control valve 160 may be placed on the construction machine 100.

Here, the main control valve 160 may be connected to the large chamber 142 through a large chamber line 144, and the main control valve 160 may be connected to the small chamber 143 through a small chamber line 145.

The main control valve 160 may have a spool 161 placed thereon.

The spool 161 enables oil to flow toward the small chamber 143 or toward the large chamber 142. In other words, the rod 141 of the boom cylinder 140 may be raised or lowered by the operation of the spool 161 placed on the main control valve 160.

The spool 161 may be controlled by a boom-up valve 163 and a boom-down valve 164. An auxiliary pump 123 may be connected to a shaft 121 of the engine 120. The auxiliary pump 123 and the spool 161 may be connected to a boom-up valve line 165, and the boom-up valve 163 may be placed in the boom-up valve line 165. The auxiliary pump 123 and the spool 161 may be connected to a boom-down valve line 166, and the boom-down valve 164 may be placed in the boom-down valve line 166. When the boom-up valve 163 is opened, the spool 161 may move so that oil flows to the large chamber 142. When the boom-down valve 164 is opened, the spool 161 may move so that oil flows to the small chamber 143.

The opening and closing of the valve assembly 230 may be individually adjusted by a pilot pipe 250. Specifically, the valve assembly 230 includes a first line L1, a second line L2, a third line L3, an AC valve AC, and a CA valve CA.

The first line L1 is a line connected to the large chamber 142 in the boom cylinder 140. The first line L1 may be connected to the large chamber line 144. The second line L2 and the third line L3 are lines connecting the first line L1 and the accumulator 220.

The AC valve AC is placed in the second line L2. The AC valve AC may be a charging valve that is provided to enable the control of the flow of oil and to control oil to flow only toward the accumulator 220 in the second line L2 to charge the accumulator 220 with oil.

The CA valve CA is placed in the third line L3. The CA valve CA may be a discharge valve that is provided to enable the control of the flow of oil and to allow oil to flow only toward the first line L1 in the third line L3 to discharge the oil in the accumulator 220.

The valve assembly 230 may include a fifth line L5 and a sixth line L6. The fifth line L5 is a line connected to the small chamber 143 in the boom cylinder 140. The fifth line L5 may have one side connected to the small chamber 143 in the boom cylinder 140. The fifth line L5 may be connected to the small chamber line 145.

The sixth line L6 is a line that is branched from the first line L1 and connected to the fifth line L5. The sixth line L6 may be provided with an AB valve AB to enable the control of the flow rate of oil in the sixth line L6. The AB valve AB may be a regeneration valve that allows some of the oil flowing in the first line L1 to flow into the small chamber 143 in the boom cylinder 140 through the sixth line L6 and the fifth line L5.

The valve assembly 230 may include a seventh line L7. The seventh line L7 is a line that is branched from the first line L1 and connected to a second oil tank T2 to be described later. The seventh line L7 may be further provided with an AR valve AR (not shown) to enable the control of the flow rate of oil in the seventh line L7. The AR valve AR may be a return valve that is configured to allow the inflow of some of the oil flowing to the accumulator 220 if the accumulator 220 is full of oil.

The valve assembly 230 may further include an eighth line L8 having one side connected to the fifth line L5 and the sixth line L6. The eighth line L8 may be connected to a third oil tank T3 to be described later. The oil that has passed through the AB valve AB may also flow into the third oil tank T3 through the eighth line L8.

The valve assembly 230 may include a release valve RE. The release valve RE is placed on the passage between the accumulator 220 and a first oil tank T1 to be described later. The release valve RE is placed on the passage between the accumulator 220 and the first oil tank T1 and is operated in an on/off manner.

The CA valve CA, AC valve AC, AB valve AB, AR valve AR (not shown), release valve RE, etc. of the valve assembly 230 discussed above may all be controlled by the controller 170.

The main pipe 240 is a pipe connected to the boom cylinder 140. The main pipe 240 may be provided in a single one, and the first line L1 and the fifth line L5 may be formed together in the main pipe 240. Alternatively, the main pipe 240 may consist of two main pipes, and the first line L1 and the fifth line L5 may be formed separately in the respective main pipes. The main pipe 240 may be provided with a joint block 241 at the tip thereof. The large chamber 142 and the small chamber 143 in the boom cylinder 140 may be connected to the joint block 241.

The engine 120 may be equipped with a shaft 121, which is connected to a main pump 122. The main pump 122 and the spool 161 may be connected to a main valve line 162, and oil may flow to the spool 161 and the main control valve 160 through the main valve line 162.

At least one oil tank T may be provided to store oil introduced thereinto or to discharge the stored oil therefrom.

The oil tank T may include the first oil tank T1 connected to the release valve RE via a pipe, the second oil tank T2 connected to the seventh line, and the third oil tank T3 connected to the eighth line.

Meanwhile, the hydraulic system for recovering boom energy for construction machinery according to the first embodiment of the present disclosure may be controlled by a mobile device 400, and the mobile device 400 may be a terminal held by a user or an operator.

The mobile device 400 may be communicatively connected to the controller 170. In addition, the mobile device 400 may be controllably connected to the controller 170, and the hydraulic system for recovering boom energy for construction machinery may be controlled by the mobile device 400.

Specifically, the operations of various devices including the main control valve 160, the valve assembly 230, and the engine 120 may be controlled by the controller 170 based on the operation signal of the mobile device 400.

The mobile device 400 may include an input means (not shown) to input a control command and an output means including a display means (not shown) to display various statuses of operation.

Here, the mobile device 400 may be any one of a smartphone, a PDA, a laptop, and a tablet.

Moreover, the mobile device 400 may be configured to communicate with the controller 170 through serial communication or Ethernet communication or through Wi-Fi, Bluetooth, Zigbee, beacon, RFID, or the like, and the communication method of the mobile device 400 is not limited thereto.

For this purpose, the mobile device 400 may be equipped with a program or application for controlling and operating the hydraulic system for recovering boom energy for construction machinery through the controller 170.

The controller 170 may control the operation of the construction machine 100 based on the operation signal. For this purpose, the controller 170 may be an electronic control unit (ECU).

Specifically, the controller 170 may control the operations of various devices including the main control valve 160, the valve assembly 230, and the engine 120 to operate the hydraulic system for recovering boom energy for construction machinery, based on the operation signal from the control operation of the mobile device 400.

The controller 170 may control whether to open or close the boom-up valve 163 or the boom-down valve 164 based on the operation signal from the control operation of the mobile device 400.

In addition, the controller 170 may control the operation of the construction machine 100 and may control whether to open or close the boom-up valve 163 or the boom-down valve 164, based on the operation signal of the joystick 151.

For this purpose, the joystick 151 may be equipped with a first sensor S1 and a second sensor S2. The first sensor S1 may detect a change in pressure during boom-up motion by the joystick 151 to generate an operation signal, and the second sensor S2 may detect a change in pressure during boom-down motion by the joystick 151 to generate an operation signal.

The operation signals generated by the first sensor S1 and the second sensor S2 may be transmitted to the controller 170, and the controller 170 may control whether to open or close the boom-up valve 163 or the boom-down valve 164 based on these operation signals.

Here, the operation signals generated by the first sensor S1 and the second sensor S2 may be transmitted to the mobile device 400 through the controller 170. This may allow the mobile device 400 to control whether to open or close the boom-up valve 163 or the boom-down valve 164.

Meanwhile, the boom-down valve 164 may also be placed in the large chamber line 144. In other words, the boom-down valve 164 may control a flow in the boom-down valve line 166 as well as a flow in the large chamber line 144. In this case, in some situations, when the joystick 151 is operated for boom-down, the controller 170 may control the boom-down valve 164 to close, thereby blocking the flow of oil from the large chamber 142 to the main control valve 160.

By means of the structure as described above, the controller 170 may cause oil discharged from the large chamber 142 during boom-down by the boom cylinder 140 to be recovered and reused immediately for a driving force for boom-up or running of the construction machine 100, the boom cylinder, a bucket, and an arm, and a driving force for swing of the body 110.

These settings and de-settings may be performed by control of the controller 170 through the mobile device 400. In addition, these settings and de-settings may be performed by control of the controller 170 in response to the operation signal of the joystick 151.

Meanwhile, a third sensor S3 and a fourth sensor S4 may be placed in the first line L1 and the fifth line L5, respectively. The third sensor S3 and the fourth sensor S4 may constantly measure a hydraulic pressure and transmit measured values of hydraulic pressure to the controller 170.

The third sensor S3 and the fourth sensor S4 may measure a hydraulic pressure in the boom cylinder 140, and a fifth sensor S5 may measure a pressure in the accumulator 220. The controller may receive the measured value of hydraulic pressure in the boom cylinder 140 through the third sensor S3 and the fourth sensor S4, receive the measured value of pressure in the accumulator 220 through the fifth sensor S5, and then control the flow rate of oil by opening and closing one or more valves installed in a selected one of a plurality of lines of the valve assembly 230, based on the measured values received from the third sensor S3, the fourth sensor S4, and the fifth sensor S5.

Hereinafter, a process of operation of the hydraulic system for recovering boom energy for construction machinery according to the first embodiment of the present disclosure will be briefly described with reference to FIG. 6.

When the boom 130 is moved down, the boom-down valve 164 is closed, oil flows into the small chamber 143 in the boom cylinder 140 to lower the rod 141 of the boom cylinder 140, and the oil within the large chamber 142 is discharged through the first line L1 as the rod 141 is lowered.

The AC valve AC placed in the second line L2 is opened so that the oil discharged from the large chamber 122 flows into the accumulator 220 through the first line L1 and the second line L2 for accumulation.

The CA valve CA placed in the third line L3 may be opened to introduce the oil accumulated in the accumulator 220 into the large chamber 142 in the boom cylinder 140 through the third line L3 and the first line L1 and to use the energy recovered in the event of boom-down immediately for boom-up.

Here, when the oil accumulated in the accumulator 220 flows into the large chamber 142 in the boom cylinder 140 through the third line L3 and the first line L1, the AC valve AC placed in the second line L2 may be closed to introduce the oil accumulated in the accumulator 220 only into the boom cylinder 140.

In this case, since the boom-down valve 164 is locked, oil may be discharged only to the first line L1 without flowing toward the main control valve 160.

This process may allow the boom energy of the boom 130 to be stored in the accumulator 220, and the stored boom energy may be utilized for the boom-up of the boom 130 to save fuel or improve performance of the construction machine 100.

In other words, since the oil accumulated in the accumulator 220 is immediately used to assist the power required for the boom-up motion of the boom 130, a mechanical energy conversion unit or/and an electrical energy conversion unit for energy conversion is not required, which can make the system slimmer.

In addition, it is possible to increase a boom-up speed by increasing the amount of oil introduced into the large chamber 142, such as by introducing oil from the accumulator 220 to the large chamber 142 through the third line L3 and the first line L1, in addition to the inflow of oil to the large chamber 142 through the large chamber line 144 by the main pump 122 of the engine 120.

In this case, the AB valve AB, the AR valve AR, and the boom-down valve 164 may be closed, and only the CA valve CA placed in the third line L3 may be opened to introduce oil only into the large chamber 142 through the third line L3 and the first line L1 so as to assist the power required for boom-up motion.

Second Embodiment

Figure 7:
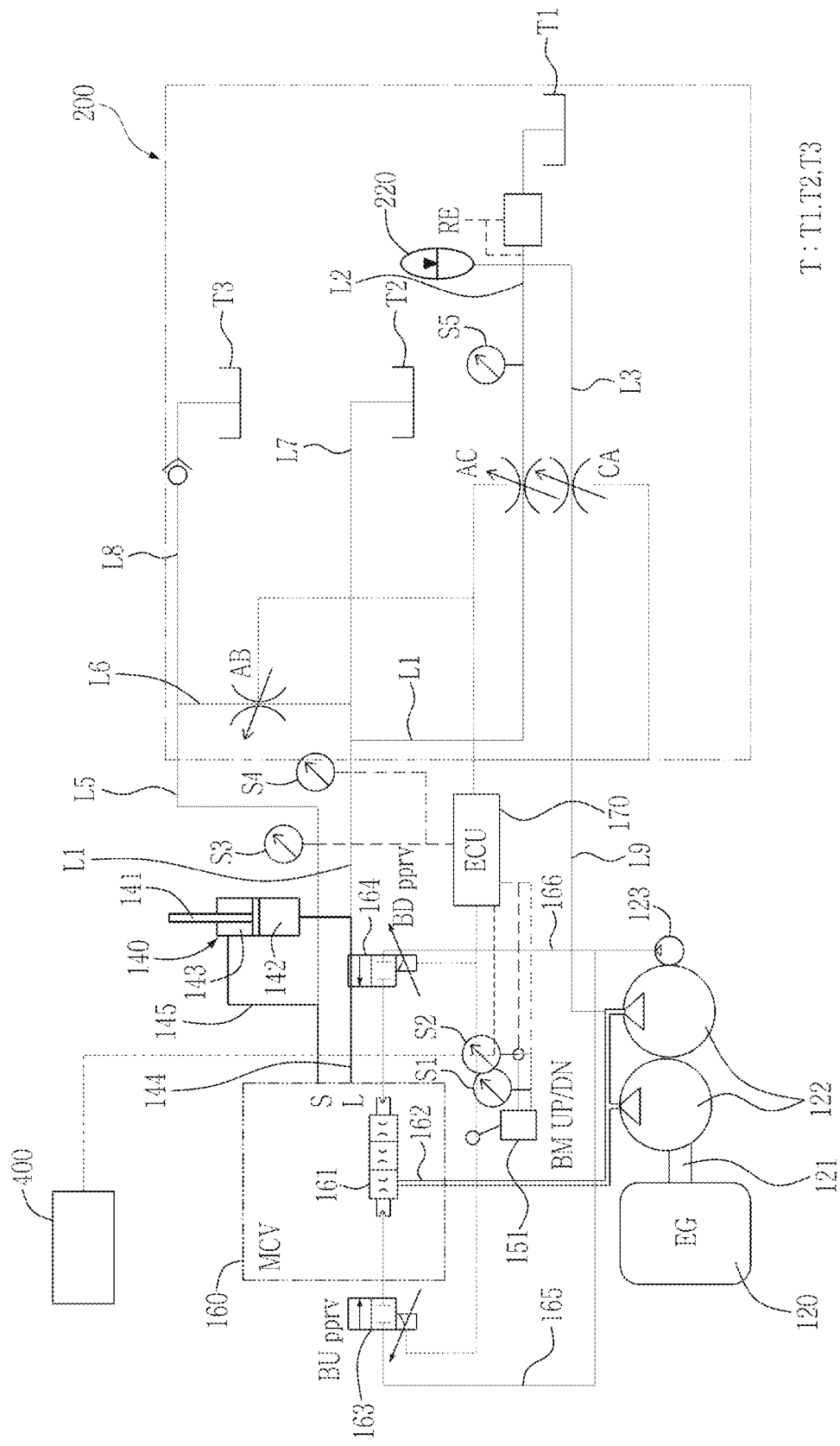
FIG. 7 is a schematic diagram illustrating a hydraulic system for recovering boom energy for construction machinery according to a second embodiment of the present disclosure.
Figure 8:
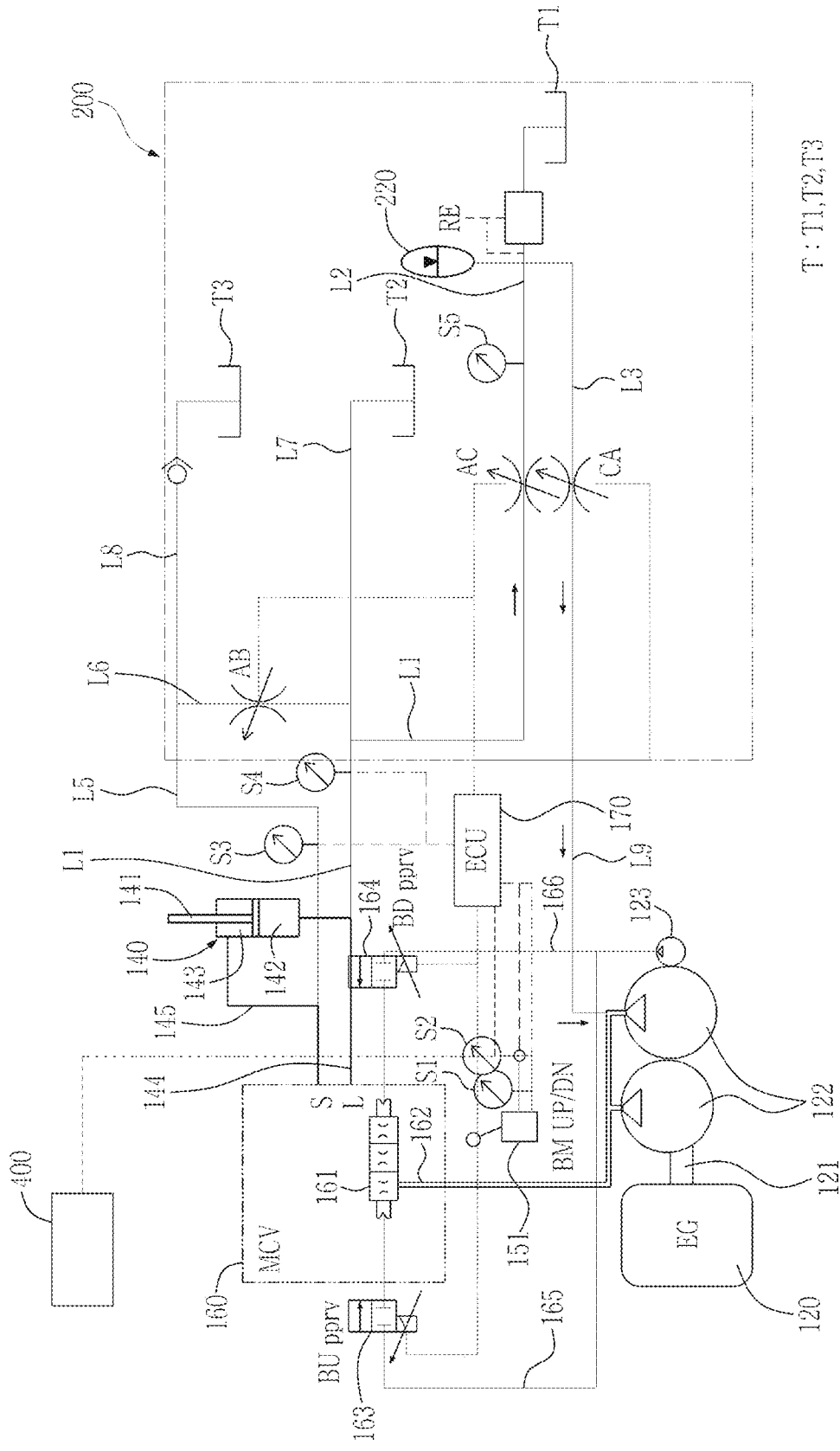
FIG. 8 is a schematic diagram illustrating a flow of oil when oil recovered from a large chamber during boom-down of a boom is supplied to a main pump to drive an engine and used for a driving force for construction machine running, a boom cylinder, a bucket, and an arm, and a driving force for body swing in the hydraulic system for recovering boom energy for construction machinery according to the second embodiment of the present disclosure.

FIG. 7 is a schematic diagram illustrating a hydraulic system for recovering boom energy for construction machinery according to a second embodiment of the present disclosure. FIG. 8 is a schematic diagram illustrating a flow of oil when oil recovered from a large chamber during boom-down of a boom is supplied to a main pump to drive an engine and used for a driving force for construction machine running, a boom cylinder, a bucket, and an arm, and a driving force for body swing in the hydraulic system for recovering boom energy for construction machinery according to the second embodiment of the present disclosure.

The hydraulic system for recovering boom energy for construction machinery according to the second embodiment of the present disclosure has the same structure as the hydraulic system for recovering boom energy for construction machinery according to the first embodiment of the present disclosure, with the sole exception that a third line connected to the accumulator is connected to the main pump of the engine through a ninth line. Therefore, a redundant description of the same configuration will be omitted.

Referring to FIGS. 7 and 8, the valve assembly according to the second embodiment of the present disclosure may include a third line L3 having one side connected to the accumulator 220 and a ninth line L9 connecting the third line L3 and the main pump 122.

The CA valve CA may be placed in the third line L3 to control the flow rate of oil so as to allow oil to flow only toward the ninth line L9 in the third line L3.

Thus, when the boom 130 is moved down, the boom-down valve 164 is closed, oil flows into the small chamber 143 in the boom cylinder 140 to lower the rod 141 of the boom cylinder 140, and the oil within the large chamber 142 is discharged through the first line L1 as the rod 141 is lowered.

The AC valve AC placed in the second line L2 may be opened so that the oil discharged from the large chamber 142 flows into the accumulator 220 through the first line L1 and the second line L2 for accumulation.

The CA valve CA placed in the third line L3 may be opened to introduce the oil accumulated in the accumulator 220 into the main pump 122 through the third line L3 and the ninth line L9 and to use the energy recovered in the event of boom-down for driving the engine 120 through the main pump 122 and immediately for a driving force for running of the construction machine 100, the boom cylinder 140, the bucket, and the arm, and a driving force for swing of the body 110.

Here, when the oil accumulated in the accumulator 220 flows into the main pump 122 through the third line L3 and the ninth line L9, the AC valve AC placed in the second line L2 may be closed to introduce the oil accumulated in the accumulator 220 only into the main pump 122.

In this case, since the boom-down valve 164 is locked, oil may be discharged only to the first line L1 without flowing toward the main control valve 160.

This process may allow the boom energy of the boom 130 to be stored in the accumulator 220, and the stored boom energy may be provided to the engine 120 to be used for a driving force for running of the construction machine 100, the boom cylinder 140, the bucket, and the arm, and a driving force for swing of the body 110.

In other words, the oil accumulated in the accumulator 220 may be immediately used to assist the power of the engine 120, thereby saving fuel or improving performance of the construction machine 100.

Third Embodiment

Figure 9:
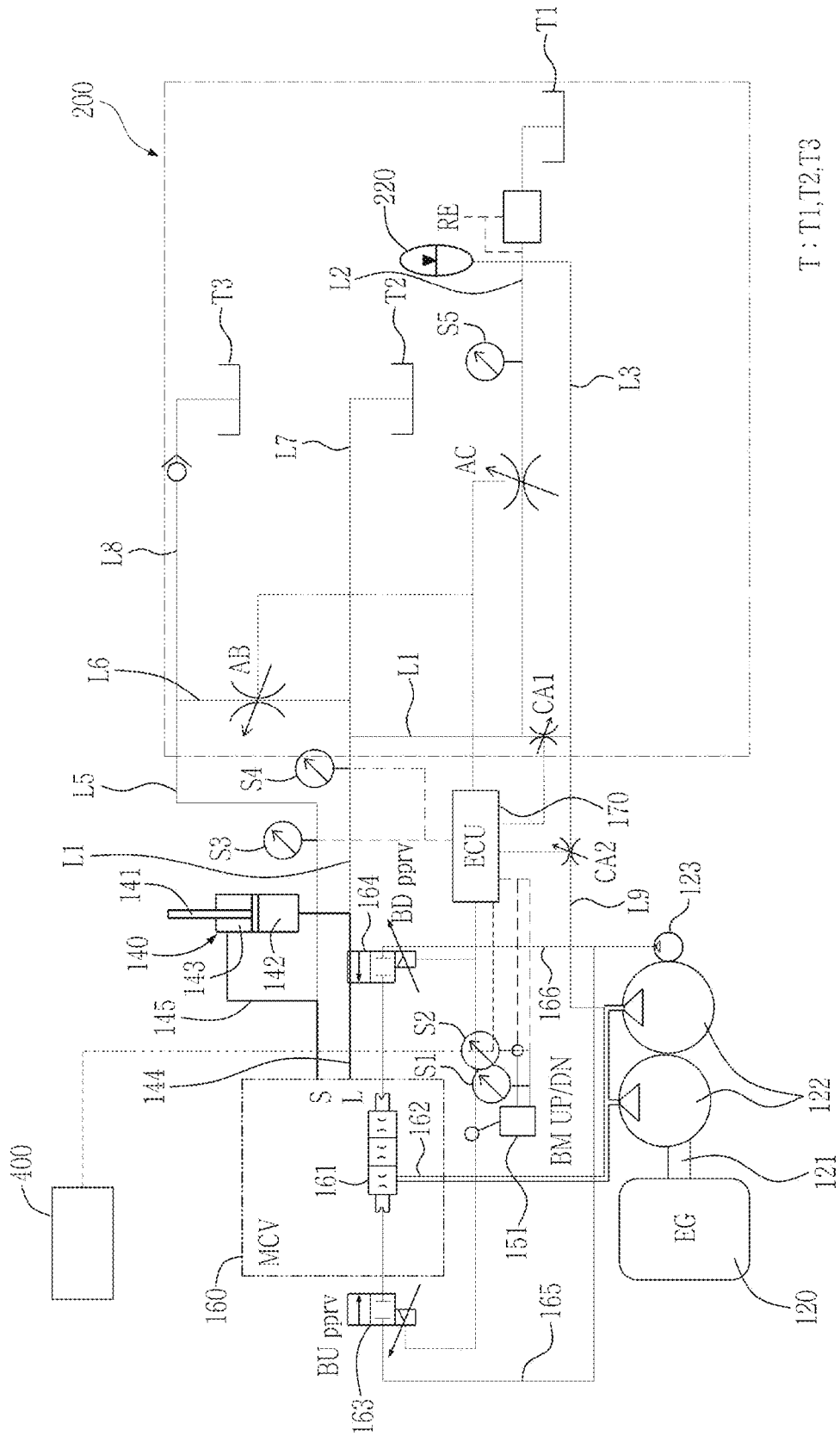
FIG. 9 is a schematic diagram illustrating a hydraulic system for recovering boom energy for construction machinery according to a third embodiment of the present disclosure.
Figure 10:
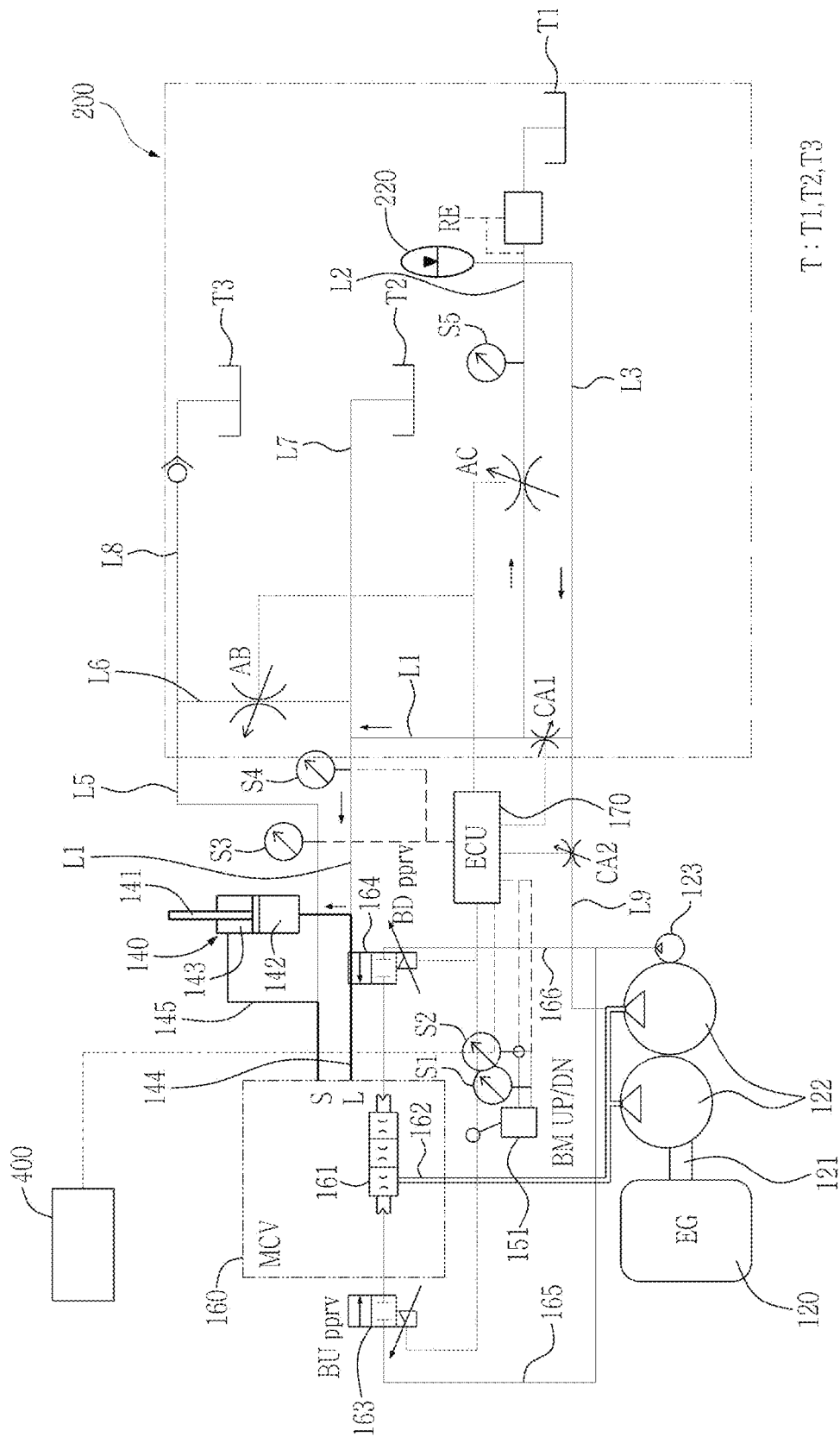
FIG. 10 is a schematic diagram illustrating a flow of oil when oil recovered from a large chamber during boom-down of a boom is accumulated and then supplied to the large chamber for boom-up in the hydraulic system for recovering boom energy for construction machinery according to the third embodiment of the present disclosure.
Figure 11:
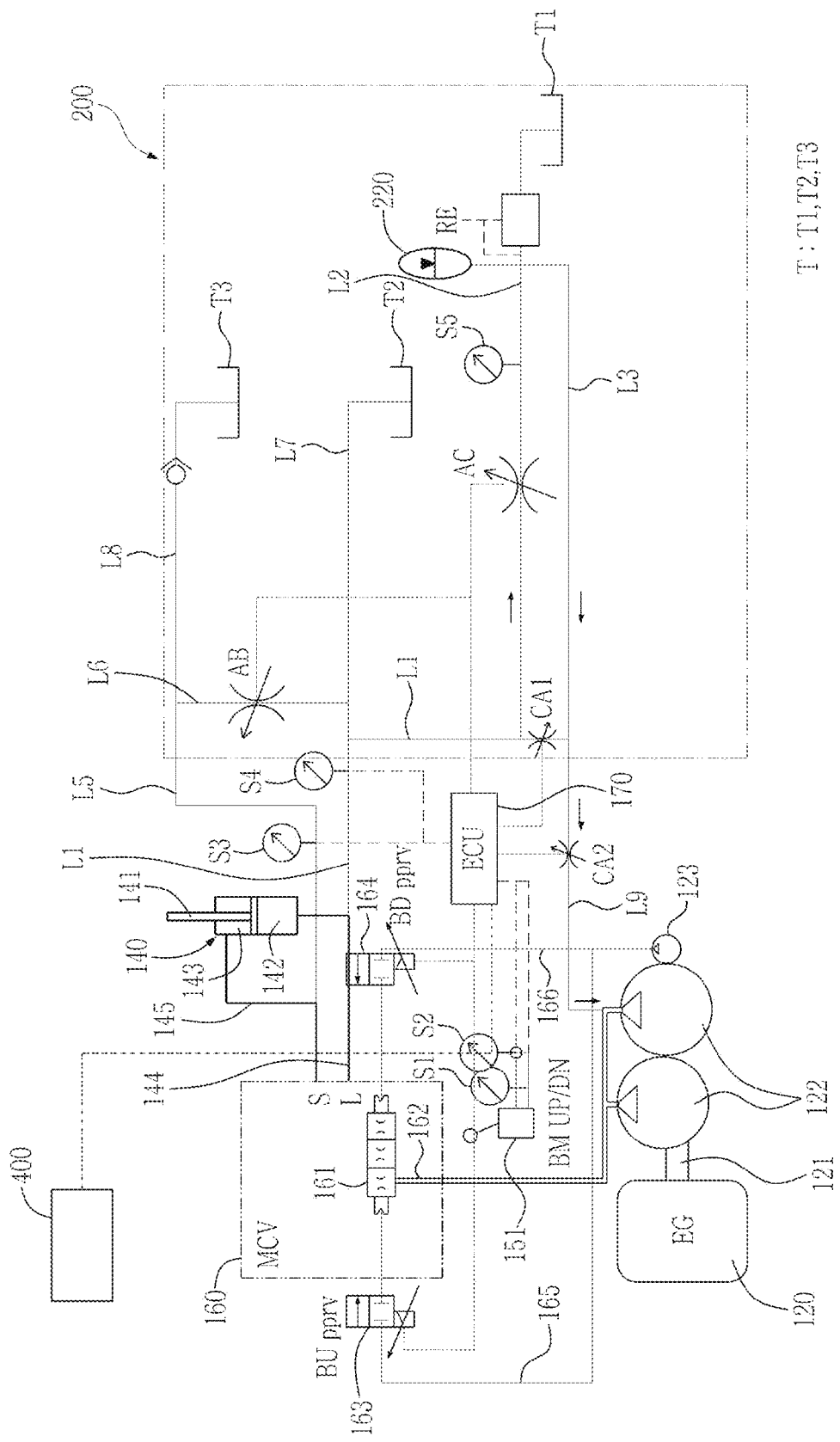
FIG. 11 is a schematic diagram illustrating a flow of oil when oil recovered from a large chamber during boom-down of a boom is supplied to a main pump to drive an engine and used for a driving force for construction machine running, a boom cylinder, a bucket, and an arm, and a driving force for body swing in the hydraulic system for recovering boom energy for construction machinery according to the third embodiment of the present disclosure.

FIG. 9 is a schematic diagram illustrating a hydraulic system for recovering boom energy for construction machinery according to a third embodiment of the present disclosure. FIG. 10 is a schematic diagram illustrating a flow of oil when oil recovered from a large chamber during boom-down of a boom is accumulated and then supplied to the large chamber for boom-up in the hydraulic system for recovering boom energy for construction machinery according to the third embodiment of the present disclosure. FIG. 11 is a schematic diagram illustrating a flow of oil when oil recovered from a large chamber during boom-down of a boom is supplied to a main pump to drive an engine and used for a driving force for construction machine running, a boom cylinder, a bucket, and an arm, and a driving force for body swing in the hydraulic system for recovering boom energy for construction machinery according to the third embodiment of the present disclosure.

The hydraulic system for recovering boom energy for construction machinery according to the third embodiment of the present disclosure has the same structure as the hydraulic system for recovering boom energy for construction machinery according to the second embodiment of the present disclosure, with the sole exception that a third line connected to the accumulator is connected to the first line and the valve is changed in position as well as addition of valves. Therefore, a redundant description of the same configuration will be omitted.

Referring to FIGS. 9 to 11, the valve assembly according to the third embodiment of the present disclosure may be configured such that a third line L3 connects the first line L1 and the accumulator 220 and a ninth line L9 connects the third line L3 and the main pump 122.

In addition, the valve assembly may include a first CA valve CA1 placed in the first line L1 adjacent to the connection point between the first line L1 and the third line L3 to allow oil to flow only toward the first line L1 and control the flow rate of oil, and a second CA valve CA2 placed in the ninth line L9 to allow oil to flow only to the main pump 122 through the ninth line L9 and control the flow rate of oil.

When the boom 130 is moved down, the boom-down valve 164 is closed, oil flows into the small chamber 143 in the boom cylinder 140 to lower the rod 141 of the boom cylinder 140, and the oil within the large chamber 142 is discharged through the first line L1 as the rod 141 is lowered.

If the energy recovered in the event of boom-down is used immediately for boom-up, as illustrated in FIG. 10, the AC valve AC placed in the second line L2 is opened so that the oil discharged from the large chamber 142 flows into the accumulator 220 through the first line L1 and the second line L2 for accumulation.

The first CA valve CA1 placed in the first line L1 may be opened to introduce the oil accumulated in the accumulator 220 into the large chamber 142 in the boom cylinder 140 through the third line L3 and the first line L1 and to use the energy recovered in the event of boom-down immediately for boom-up.

Here, when the oil accumulated in the accumulator 220 flows into the large chamber 142 in the boom cylinder 140 through the third line L3 and the first line L1, the AC valve AC placed in the second line L2 may be closed to introduce the oil accumulated in the accumulator 220 only into the boom cylinder 140.

In this case, since the boom-down valve 164 is locked, oil may be discharged only to the first line L1 without flowing toward the main control valve 160.

This process may allow the boom energy of the boom 130 to be stored in the accumulator 220, and the stored boom energy may be utilized for the boom-up of the boom 130 to save fuel or improve performance of the construction machine 100.

Meanwhile, if the energy recovered in the event of boom-down is used for various operations of the construction machine, as illustrated in FIG. 11, the AC valve AC placed in the second line L2 may be opened so that the oil discharged from the large chamber 142 flows into the accumulator 220 through the first line L1 and the second line L2 for accumulation.

The second CA valve CA2 placed in the ninth line L9 may be opened to introduce the oil accumulated in the accumulator 220 into the main pump 122 through the third line L3 and the ninth line L9 and to use the energy recovered in the event of boom-down for driving the engine 120 through the main pump 122 and immediately for a driving force for construction machine running, the boom cylinder, the bucket, and the arm, and a driving force for body swing.

Here, when the oil accumulated in the accumulator 220 flows into the main pump 122 through the third line L3 and the ninth line L9, the AC valve AC placed in the second line L2 and the first CA valve CA1 placed in the first line L1 are closed to introduce the oil accumulated in the accumulator 220 only into the main pump 122.

In this case, since the boom-down valve 164 is locked, oil may be discharged only to the first line L1 without flowing toward the main control valve 160.

This process may allow the boom energy of the boom 130 to be stored in the accumulator 220, and the stored boom energy may be provided to the engine 120 to be used for a driving force for construction machine running, the boom cylinder, the bucket, and the arm, and a driving force for swing of the body.

The hydraulic system for recovering boom energy for construction machinery according to the third embodiment of the present disclosure may selectively control the first CA valve CA1 placed in the first line L1 or the second CA valve CA2 placed in the ninth line L9 to use boom energy generated during the boom-down of the boom 130 for boom-up or as power of the engine 120, thereby achieving improvement in work efficiency, fuel saving, and improvement in performance.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A hydraulic system for recovering boom energy for construction machinery, which is installed in a construction machine to recover and reuse energy during boom-down by controlling a flow of oil, wherein the construction machine comprises a boom cylinder comprising a rod raised and lowered by means of the flow of oil, a large chamber, and a small chamber formed on the large chamber, an accumulator assembly comprising an accumulator connected to the boom cylinder to accumulate oil, and a boom driven up/down by the boom cylinder by means of the flow of oil, the hydraulic system comprising:
a main control valve configured to allow the boom to be moved up/down by the boom cylinder;
a valve assembly comprising a plurality of lines through which oil flows, and at least one valve installed in a selected one of the plurality of lines to control a flow rate of oil;
an engine connected at its shaft to a main pump to provide the flow of oil to the boom cylinder and provide a driving force for construction machine running, buckets, and arms, and a driving force for body swing; and
a controller configured to control the flow of oil based on an operation signal,
wherein the oil discharged from the large chamber during boom-down by the boom cylinder is recovered and immediately reused,
wherein the main control valve comprises a spool operated to allow oil to flow toward the large chamber or the small chamber in the boom cylinder, a boom-up valve line connected to the spool and in which oil flows into the large chamber by movement of the spool to allow the boom to be moved up, a boom-down valve line connected to the spool and in which oil flows into the small chamber by movement of the spool to allow the boom to be moved down, a boom-up valve placed in the boom-up valve line to control the spool so that oil flows into the large chamber, and a boom-down valve placed in the boom-down valve line to control the spool so that oil flows into the small chamber,
wherein the controller is connected to a joystick that controls boom-up or boom-down motion of the boom, and
wherein the controller is configured to:
receive measured values by connection to a first sensor connected to the joystick to detect a change in pressure for the boom-up motion by the joystick and generate an operation signal, and a second sensor connected to the joystick to detect a change in pressure for the boom-down motion by the joystick and generate an operation signal, and
control whether to open or close the boom-up valve or the boom-down valve based on the operation signals generated by the first sensor and the second sensor.

2. The hydraulic system according to claim 1, wherein the controller is configured to:
receive measured values by connection to third and fourth sensors for measuring a hydraulic pressure in the boom cylinder and a fifth sensor for measuring a pressure in the accumulator; and
control the flow rate of oil by opening and closing one or more valves installed in a selected one of the plurality of lines of the valve assembly, based on the measured values received from the third sensor, the fourth sensor, and the fifth sensor.

3. A hydraulic system for recovering boom energy for construction machinery, which is installed in a construction machine to recover and reuse energy during boom-down by controlling a flow of oil, wherein the construction machine comprises a boom cylinder comprising a rod raised and lowered by means of the flow of oil, a large chamber, and a small chamber formed on the large chamber, an accumulator assembly comprising an accumulator connected to the boom cylinder to accumulate oil, and a boom driven up/down by the boom cylinder by means of the flow of oil, the hydraulic system comprising:
a main control valve configured to allow the boom to be moved up/down by the boom cylinder;
a valve assembly comprising a plurality of lines through which oil flows, and at least one valve installed in a selected one of the plurality of lines to control a flow rate of oil;
an engine connected at its shaft to a main pump to provide the flow of oil to the boom cylinder and provide a driving force for construction machine running, buckets, and arms, and a driving force for body swing; and
a controller configured to control the flow of oil based on an operation signal,
wherein the oil discharged from the large chamber during boom-down by the boom cylinder is recovered and immediately reused, and
wherein the valve assembly comprises:
a first line having one side connected to the large chamber in the boom cylinder, a second line connecting the first line and the accumulator, a third line connecting the first line and the accumulator, a fifth line having one side connected to the small chamber in the boom cylinder, a sixth line branched from the first line and connected to the fifth line, a seventh line branched from the first line, and an eighth line having one side connected to the fifth line and the sixth line; and
an AC valve placed in the second line to allow oil to flow only toward the accumulator and configured to control the flow rate of oil, a CA valve placed in the third line to allow oil to flow only toward the first line and configured to control the flow rate of oil, an AB valve placed in the sixth line to control the flow rate of oil, and a release valve placed on a passage between the accumulator and an oil tank and operated in an on/off manner.

4. The hydraulic system according to claim 3, wherein:
when the boom is moved down, the AC valve placed in the second line is opened so that the oil discharged from the large chamber flows into the accumulator through the first line and the second line for accumulation; and
the CA valve placed in the third line is opened to introduce the oil accumulated in the accumulator into the large chamber in the boom cylinder through the third line and the first line and to use energy recovered in the event of boom-down immediately for boom-up.

5. The hydraulic system according to claim 1, wherein the valve assembly comprises:
a first line having one side connected to the large chamber in the boom cylinder, a second line connecting the first line and the accumulator, a third line having one side connected to the accumulator, a fifth line having one side connected to the small chamber in the boom cylinder, a sixth line branched from the first line and connected to the fifth line, a seventh line branched from the first line, an eighth line having one side connected to the fifth line and the sixth line, and a ninth line connecting the third line and the main pump; and an AC valve placed in the second line to allow oil to flow only toward the accumulator and configured to control the flow rate of oil, a CA valve placed in the third line to allow oil to flow only toward the ninth line and configured to control the flow rate of oil, an AB valve placed in the sixth line to control the flow rate of oil, and a release valve placed on a passage between the accumulator and an oil tank and operated in an on/off manner.

6. The hydraulic system according to claim 5, wherein:
when the boom is moved down, the AC valve placed in the second line is opened so that the oil discharged from the large chamber flows into the accumulator through the first line and the second line for accumulation; and
the CA valve placed in the third line is opened to introduce the oil accumulated in the accumulator into the main pump through the third line and the ninth line and to use energy recovered in the event of boom-down for driving the engine through the main pump and immediately for the driving force for construction machine running, boom cylinders, buckets, and arms, and the driving force for body swing.

7. The hydraulic system according to claim 1, wherein the valve assembly comprises:
a first line having one side connected to the large chamber in the boom cylinder, a second line connecting the first line and the accumulator, a third line connecting the first line and the accumulator, a fifth line having one side connected to the small chamber in the boom cylinder, a sixth line branched from the first line and connected to the fifth line, a seventh line branched from the first line, an eighth line having one side connected to the fifth line and the sixth line, and a ninth line connecting the third line and the main pump; and
an AC valve placed in the second line to allow oil to flow only toward the accumulator and configured to control the flow rate of oil, a first CA valve placed in the first line adjacent to a connection point between the first line and the third line to allow oil to flow only toward the first line and control the flow rate of oil, a second CA valve placed in the ninth line to allow oil to flow only to the main pump through the ninth line and control the flow rate of oil, an AB valve placed in the sixth line to control the flow rate of oil, and a release valve placed on a passage between the accumulator and an oil tank and operated in an on/off manner.

8. The hydraulic system according to claim 7, wherein:
when the boom is moved down, the AC valve placed in the second line is opened so that the oil discharged from the large chamber flows into the accumulator through the first line and the second line for accumulation; and
the second CA valve placed in the ninth line is closed and the first CA valve placed in the first line adjacent to the connection point between the first line and the third line is opened, to introduce the oil accumulated in the accumulator into the large chamber in the boom cylinder through the third line and the first line and to use energy recovered in the event of boom-down immediately for boom-up.

9. The hydraulic system according to claim 7, wherein:
when the boom is moved down, the AC valve placed in the second line is opened so that the oil discharged from the large chamber flows into the accumulator through the first line and the second line for accumulation; and
the first CA valve placed in the first line adjacent to the connection point between the first line and the third line is closed and the second CA valve placed in the ninth line is opened, to introduce the oil accumulated in the accumulator into the main pump through the third line and the ninth line and to use energy recovered in the event of boom-down for driving the engine through the main pump and immediately for the driving force for construction machine running, boom cylinders, buckets, and arms, and the driving force for body swing.

\* \* \* \* \*